W. GESSNER.
Cotton-Seed Planters.

No. 129,943. Patented July 30, 1872.

Witnesses:
A. Bennerkendorf.
C. Sedgwick.

Inventor:
W. Gessner
per
Attorneys.

UNITED STATES PATENT OFFICE.

WILLIAM GESSNER, OF CAPE GIRARDEAU, MISSOURI.

IMPROVEMENT IN COTTON-SEED PLANTERS.

Specification forming part of Letters Patent No. 129,943, dated July 30, 1872.

Specification describing a new and Improved Cotton-Planter, invented by WILLIAM GESSNER, of Cape Girardeau, in the county of Cape Girardeau and State of Missouri.

Figure 1:
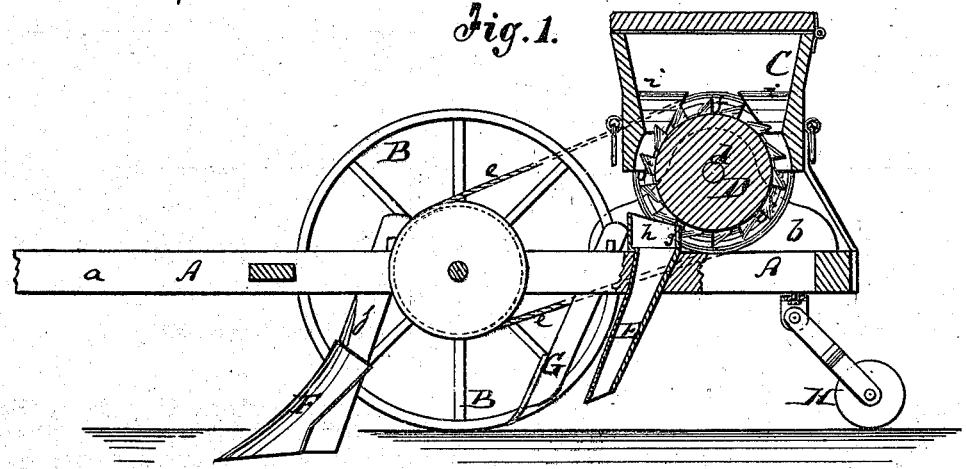
Figure 2:
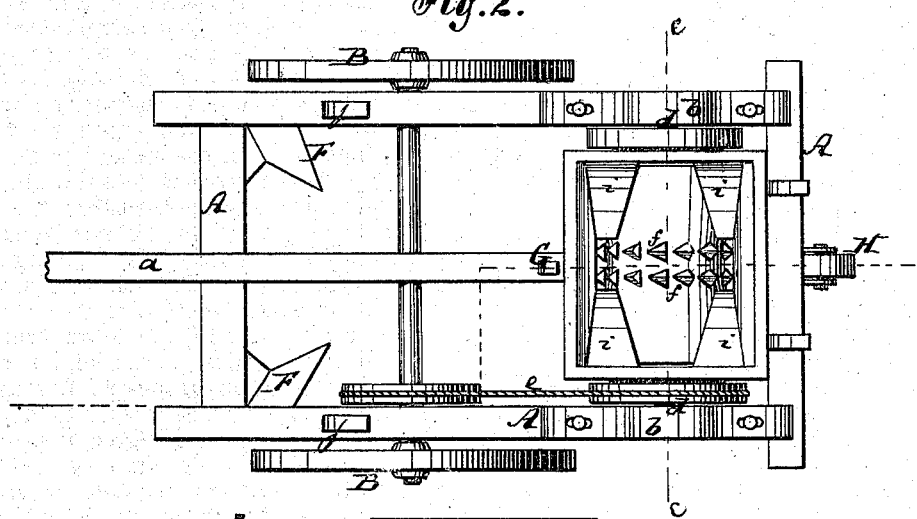

In the accompanying drawing, Figure 1 is a vertical longitudinal section of my improved cotton-planter. Fig. 2 is a top view of the same, and Fig. 3 a vertical transverse section of the same on the line *c c*, Fig. 2.

Similar letters of reference indicate corresponding parts.

This invention relates to a new drop arrangement and to a new combination of the furrow opening and closing devices that pertain to a cotton-planter, with the object of simplifying the operation of separating and dropping the seeds and embedding the same in the soil. The invention consists principally in providing the double conical drop-drum with circular rows of projecting teeth, and in combining it with a box-shaped upper attachment of the drop-tube, whose back plate extends up to the drum and is notched to admit the teeth. No seed can thus enter the tube except what is just in front of the teeth. The necessary separation of the adhesive cotton-seeds is thus effected and waste of seed prevented. The invention also consists in the combination of two mold-boards for forming the ridge of a scraper for opening the furrow and a roller for closing it with each other and with the above-mentioned dropping device.

Figure 3:
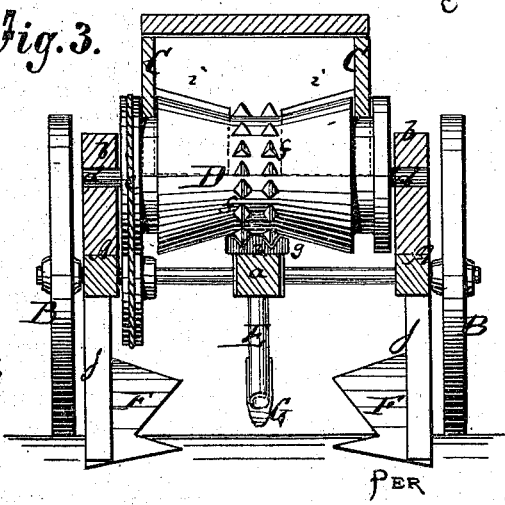

A in the drawing represents the frame of the cotton-planter. It is supported on wheels B B near the front, and has a tongue or beam extension, *a*, to which the draft-animals are attached. C is the seed-hopper, supported rigidly on the frame A, and by preference on longitudinally-adjustable boxes *b b*, which are fastened to the frame A. The bottom of this hopper is formed by a double conical drum, D—that is to say, by a drum which is smaller in the middle than toward the ends, as is clearly shown in Fig. 3. The drum is mounted upon a shaft, *d*, whose bearings are in the boxes *b*, and which receives rotary motion by belt *e* or other means from the axle of the wheels B, or from one of the wheels B. When the belt *e* gets slack the drum, with hopper, can, owing to the movable boxes *b*, be moved back to draw it tight again. Nearest the small part of the drum D are arranged thereon two (more or less) circular rows of projecting teeth, *f f*, which enter the notched back plate *g* of the box-shaped upper terminus *h* of the drop-tube E. The back plate *g* is notched just sufficient to admit the teeth *f*, and otherwise reaches to the drum D, as shown in Fig. 3. The teeth drawing the seed from the hopper cannot carry any into the box *h* except what passes just in front of them through the notches of the plate *g*. The carrying around of seed by the non-toothed part of the drum is prevented by plates *i i*, which are arranged within the four corners of the hopper close above the drum. The drop-tube E extends toward the ground sufficiently far to deposit the seed with the requisite degree of promptness. At the sides of the frame A are fastened, near the front end thereof, the standards *j j* of plows F F, by which the ridge for receiving the seed is thrown up. A furrow-opener, G, directly in front of the tube E, grooves the ridge for the reception of seed, while a roller, H, behind the tube E covers the seed by closing the furrow.

Having thus described my invention, I claim as new and desire to secure by Letters Patent—

1. The double conical drum D, having the teeth *f*, and combined with the notched plate *g* of the box *h*, substantially as herein shown and described.

2. The combination of the hopper C, containing the drum D, with the teeth *f*, box *h*, tube E, plows F, furrow-opener G, and roller H, substantially as herein shown and described.

WILLIAM GESSNER.

Witnesses:
 A. V. BRIESEN,
 T. B. MOSHER.